US012228182B2

(12) United States Patent
Tiefenbach et al.

(10) Patent No.: US 12,228,182 B2
(45) Date of Patent: Feb. 18, 2025

(54) BLANK OPTIMIZED BRAKE SLIDE CLIP WITH ACTIVE RETRACTION ELEMENT

(71) Applicant: Continental Automotive Systems, Inc., Auburn Hills, MI (US)

(72) Inventors: Klaus-Peter Tiefenbach, Lake Orion, MI (US); Stefan Josef Baier, Lake Orion, MI (US); Joshua Michael Frieden, Linden, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 248 days.

(21) Appl. No.: 17/782,785

(22) PCT Filed: Dec. 3, 2020

(86) PCT No.: PCT/US2020/063017
§ 371 (c)(1),
(2) Date: Jun. 6, 2022

(87) PCT Pub. No.: WO2021/113446
PCT Pub. Date: Jun. 10, 2021

(65) Prior Publication Data
US 2023/0009184 A1  Jan. 12, 2023

Related U.S. Application Data

(60) Provisional application No. 62/943,890, filed on Dec. 5, 2019.

(51) Int. Cl.
*F16D 65/097* (2006.01)
*F16D 55/00* (2006.01)

(52) U.S. Cl.
CPC ......... *F16D 65/0972* (2013.01); *F16D 55/00* (2013.01); *F16D 2055/0029* (2013.01)

(58) Field of Classification Search
CPC ................. F16D 65/0972; F16D 55/00; F16D 2055/0029
See application file for complete search history.

(56) References Cited

U.S. PATENT DOCUMENTS

| RE30,255 E | 4/1980 | Rath et al. |
| 5,323,882 A | 6/1994 | Waterman et al. |
| (Continued) |

FOREIGN PATENT DOCUMENTS

| CN | 1578883 A | 2/2005 |
| CN | 1802519 A | 7/2006 |
| (Continued) |

OTHER PUBLICATIONS

Office Action dated Feb. 7, 2024 of the counterpart Chinese applicaiton No. 202080083847.4.
(Continued)

*Primary Examiner* — Melanie Torres Williams (57) ABSTRACT

A brake assembly slide clip includes a base section. A clamping portion extends from the base section and includes a base clamping section, an inner axial holding tab and an outer axial holding tab which extend from opposed sides of from the base clamping section. A lower section extends from the base section. A tangential section extends from a second side of the lower section. An active retraction element extends from the tangential section and provides a surface against which the brake pad is disposed. The active retraction element includes a plurality of curved portions each being curved in a single direction. The active retraction element is movable in a first axial direction responsive to a brake pad force against the retraction element surface, and resiliently returns following removal of the force so as to move the brake pad in a second axial direction opposite the first axial direction.

19 Claims, 5 Drawing Sheets

(56) References Cited

U.S. PATENT DOCUMENTS

| | | |
|---|---|---|
| 7,784,591 B2 | 8/2010 | Franz et al. |
| 9,568,055 B2 | 2/2017 | Miller et al. |
| 9,677,629 B2 | 6/2017 | Boyle et al. |
| 9,939,034 B2 | 4/2018 | Miller et al. |
| 2001/0006134 A1 | 7/2001 | Wang |
| 2004/0222053 A1 | 11/2004 | Wemple et al. |
| 2007/0137952 A1 | 6/2007 | Cortinovis |
| 2009/0166135 A1 | 7/2009 | Sano |
| 2013/0001024 A1 | 1/2013 | Odaira |
| 2013/0192938 A1 | 8/2013 | Miller et al. |
| 2016/0195148 A1 | 7/2016 | Shin |
| 2016/0215842 A1 | 7/2016 | Mallmann |
| 2017/0299004 A1 | 10/2017 | Mallmann et al. |
| 2018/0038431 A1 | 2/2018 | Gerber et al. |
| 2018/0163800 A1 | 6/2018 | Barbosa et al. |
| 2018/0223928 A1 | 8/2018 | Miller et al. |
| 2018/0252280 A1 | 9/2018 | Krause et al. |
| 2019/0003538 A1 | 1/2019 | Gerber et al. |
| 2019/0249731 A1 | 8/2019 | DeMorais et al. |

FOREIGN PATENT DOCUMENTS

| | | |
|---|---|---|
| CN | 102853010 A | 1/2013 |
| CN | 107076231 A | 8/2017 |
| CN | 107429767 A | 12/2017 |
| CN | 107620775 A | 1/2018 |
| CN | 107906144 A | 4/2018 |
| CN | 108700147 A | 10/2018 |
| CN | 110382903 A | 10/2019 |
| DE | 102017004891 A1 | 11/2018 |
| EP | 1158199 A2 | 11/2001 |
| EP | 1600653 A1 | 11/2005 |
| KR | 20190096829 A | 8/2019 |
| WO | 2016141135 A1 | 9/2016 |

OTHER PUBLICATIONS

Zheng Jianyun, Bao Chunguang / Research on Design and Manufacturing Process of Hydraulic Brake Calipers Support Pins / Dec. 20, 2009.

Li Ruiqi / Force analysis in the application of EMU axle-mountedbrake discs / Sep. 30, 2016.

International Search Report and Written Opinion dated Feb. 16, 2021 from corresponding International patent application No. PCT/US2020/063017.

Notice of Allowance dated May 28, 2024 of Chinese Counterpart Application No. 202080083847.4.

BLANK OPTIMIZED BRAKE SLIDE CLIP WITH ACTIVE RETRACTION ELEMENT

FIELD OF INVENTION

The disclosure herein relates to a brake slide clip for use in a disc brake assembly.

BACKGROUND

Disc brake systems have been used extensively in the automotive industry. The friction between disc brake pads and brake rotors during braking generates large quantities of heat as brake systems convert kinetic energy into heat to slow or stop moving vehicles.

Typical disc brake systems are comprised of certain basic components. Among them is a caliper that surrounds at least a portion of a brake rotor. Mounted in the caliper are brake pads which are designed to press against the rotor causing the disc brake to slow the vehicle using the brake system.

Conventional disc brakes are often subject to undesirable drag of the disengaged pads on the rotors. The drag causes power losses, a shortening of the service life of the pad and possible overheating of the brake components and wheel bearings. Drag is caused by brake pads being constantly or intermittently urged against the disc even after release of the application pressure.

What is needed is a way to avoid undesirable brake drag between the brake pads and the rotor.

BRIEF SUMMARY

According to an example embodiment, a brake slide clip is provided for use in a disc brake assembly and includes a base section having a first side and a second side opposite the first side. A clamping portion extends from the first side of the base section and includes a base clamping section, an inner axial holding tab which extends from a first side of the base clamping section, and an outer axial holding tab which extends from a second side of the base clamping section that is opposite the first side thereof. The clamping portion is configured to clamp to a portion of an anchor bracket of the disc brake assembly. A lower section extends from the second side of the base section, the lower section having a first side which extends from the base section and a second side. A tangential abutment section extends from the second side of the lower section. An active retraction element extends from the tangential abutment section and including a flat link section providing a first surface on which a brake pad of a disc brake is disposed, a contact section providing a second surface against which the brake pad is disposed, and a spring section coupled to the flat link section. The active retraction element is disposed over the lower section and includes a plurality of curved portions. Each curved portion is curved in a single direction.

When the active retraction element is coupled to a brake pad, the active retraction element is movable from a retracted position relative to the base section and the lower section in response to movement of the brake pad presenting a force against the second surface of the contact section, and resiliently returns to the retracted position upon a spring force acting on the flat link section by the spring section overcoming the force presented by the brake pad.

The lower section is disposed perpendicular to the base section, and the tangential abutment section is disposed perpendicular to the lower section. The lower section extends from the base section via a first curved portion disposed between the lower section and the base section. The tangential abutment section extends from the lower section via a second curved portion disposed between the tangential abutment section and the lower section. The base clamping section extends from the base section via a third curved portion disposed between the base clamping section and the base section. An extension section extends from the tangential abutment section via a fourth curved portion, wherein the brake pad is disposed on a distal end portion of the extension section and the fourth curved portion includes one or more cutouts defined therein. The base section is disposed between the clamping portion and the lower section, the lower section is disposed between the base section and the tangential abutment section, and the tangential abutment section is disposed between the lower section and the extension section.

In an example embodiment, the clamping portion further includes an upper clamping section and a lower clamping section which extend from a third side and a fourth side, respectively, of the base clamping section, the clamping portion clamping to the portion of the anchor bracket by the inner axial holding tab, the outer axial holding tab, the upper clamping section and the lower clamping section.

In one implementation, the inner axial holding tab does not extend further in the axial direction than the second side of the base clamping section.

The plurality of curved portions align sections of the active retraction element relative to each other in a axial direction. Each curved portion is in a radial direction or an axial direction.

According to another example embodiment, a method of forming a brake slide clip for a disc brake assembly is disclosed, including forming a material blank having a main portion and a metal strip extending from a lengthwise side of the main portion. The method further includes defining a base section, a lower section, a tangential abutment section and a lower clamping section from a first region of the main portion by bending the lower section relative to the base section, bending the tangential abutment section relative to the lower section, and bending the lower clamping section relative to the base section, the lower section extending from the base section via a first curved portion, and the tangential abutment section extending from the lower section via a second curved portion, and the lower clamping section extending from the base section via a third curved portion. The method also includes defining a base clamping section, an upper clamping section, an inner axial holding tab, and an outer axial holding tab from a second region of the main portion by bending opposed lateral end portions of the second region so as to form the inner and outer axial holding tabs, bending the base clamping section relative to the lower clamping section, and bending the upper clamping section relative to the base clamping section The method further includes defining an active retraction element by bending the metal strip relative to the tangential abutment section in a plurality of bending operations so that portions of the active retraction element are aligned with each other in an axial direction.

In one aspect, each bending operation of the plurality of bending operations of the metal strip bends the metal strip in a single direction. The active retraction element includes a flat link section having a first surface for receiving a brake pad thereon, and a number of the plurality of bending operations for bending the metal strip between the tangential abutment section and the first surface includes at least four bending operations. Each of the plurality of bending operations of the metal strip is a bending operation in a radial direction or an axial direction.

Defining the upper clamping section may further include forming a radial holding tab by bending a lengthwise end portion of the second region of the main portion. The radial holding tab, the inner axial holding tab and the outer axial holding tab are configured for mounting the brake slide clip to an anchor bracket of the disc brake assembly.

The method may further include defining an extension section by bending a lengthwise end portion of the first region of the main portion relative to the tangential abutment section, the extension section extending from the tangential abutment section via a fourth curved portion.

The first and second curved portions each may be a 90 degree curve.

Prior to any bending and prior to performing the bending operations, the metal strip is disposed along the lengthwise side of the main portion and has a first lengthwise end which extends from the lengthwise side of the main portion and a second lengthwise end which does not extend further than a lengthwise end of the main portion of the material blank.

In another aspect, the first lengthwise end of the metal strip extends from the lengthwise side of the main portion in a single 90 degree curve.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

In general terms, a brake slide clip for a disc brake assembly includes an active retraction element integrated therein in order to retract the brake pads in an opposite direction of the brake rotor to create clearance to the brake rotor. The active retraction element is designed to plastically deform with the wear of the brake pad and brake rotor and provides an almost constant retraction force with increasing wear.

Figure 1:
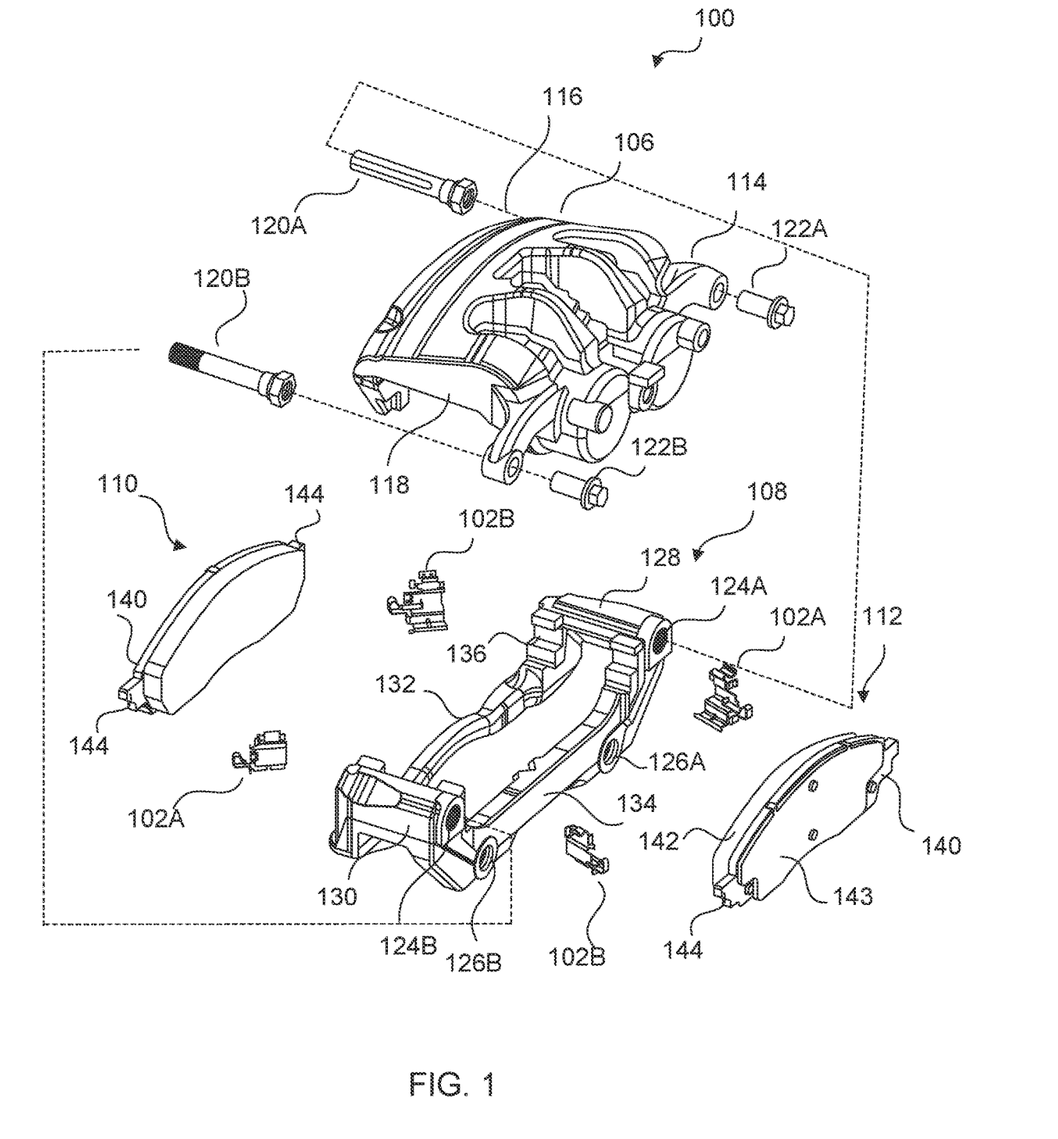
FIG. 1 illustrates an exploded perspective view of a disc brake assembly according to an example embodiment.

FIG. 1 illustrates a disc brake assembly 100 according to an example embodiment. The general structure and operation of the disc brake assembly 100 is conventional in the art.

The disc brake assembly 100 includes a caliper 106, an anchor bracket 108, and outside and inside brake pads 110 and 112, respectively. The disc brake assembly 100 is illustrated for mounting on a stationary component of a motor vehicle.

The caliper 106 includes an inner section 114 and an outer section 116 connected by an intermediate section 118. The caliper 106 is supported on the anchor bracket 108 by first and second guide pins 120A and 120B that extend into the anchor bracket 108. The caliper 106 is configured to be secured to the first and second guide pins 120A and 120B by first and second guide pin bolts 122A and 122B, respectively. The anchor bracket 108 is configured to be secured to a stationary component of a motor vehicle.

The anchor bracket 108 includes first and second spaced apart openings 124A and 124B and first and second spaced apart openings 126A and 126B. The first and second openings 124A and 124B are each adapted to receive one of the associated first or second guide pins 120A or 120B. The first and second openings 126A and 126B are each adapted to receive a mounting bolt (not shown) which is received in threaded openings provided in the stationary vehicle component (not shown), thereby securing the anchor bracket 108 to the stationary vehicle component. In another implementation, the first and second openings 126A and 126B are threaded openings and the corresponding mounting bolts extend through non-threaded openings provided in the stationary vehicle component for engagement with the first and second openings 126A, 126B.

The anchor bracket 108 also includes an axially extending first arm 128 and second arm 130. The outer ends of arms 128, 130 are connected together by an outer tie bar 132 and the inner ends of arms 128, 130 are connected together by an inner tie bar 134.

The first and second arms 128 and 130 of anchor bracket 108 include notches or channels, indicated respectively generally at 136, formed along axial ends of the arms. The channels 136 are defined along an inner wall of first arm 128 and an inner wall of second arm 130. The channels 136 slidably support the outer brake pad 110 and the inner brake pad 112. Brake slide clips 102A and 102B are mounted to or within the channels 136 and on which outer brake pad 110 and inner brake pad 112 slidingly engage. The channels 136 are configured to receive the associated inner and outer brake slide clips 102A and 102B prior to assembly of the outer and inner brake pads 110 and 112 to the anchor bracket 108. Brake slide clip 102A is the mirror image of brake slide slip 102B. One pair of brake slide clips 102A and 102B supports outer brake pad 110, and a second pair of brake slide clips 102A and 102B supports inner brake pad 112.

Each outer brake pad 110 and inner brake pad 112 includes a backing plate 140, an insulator 143 secured to the backing plate 140, and a brake friction pad 142 is secured to the backing plate 140 along an opposite surface against which the insulator 143 is secured. Each backing plate 140 includes a pair of projecting protrusions or guide rails 144 disposed at opposite ends of the backing plate 140. The guide rails 144 are configured to support the brake friction pad 142 of a brake pad 110, 112 for sliding movement within the channels 136 of the anchor bracket 108 on brake slide clips 102A and 102B.

In an example embodiment, inner brake pad 112 is supported and operatively coupled to a brake piston (not shown) of the disc brake assembly 100 for sliding movement within channels 136 along brake slide clips 102A and 102B responsive to movement of the brake piston. Alternatively, outer brake pad 110 may be supported and operatively coupled to the brake piston. Each guide rail 144 may have a generally rectangular cross sectional shape, though it is understood that other shapes are possible.

Figure 2:
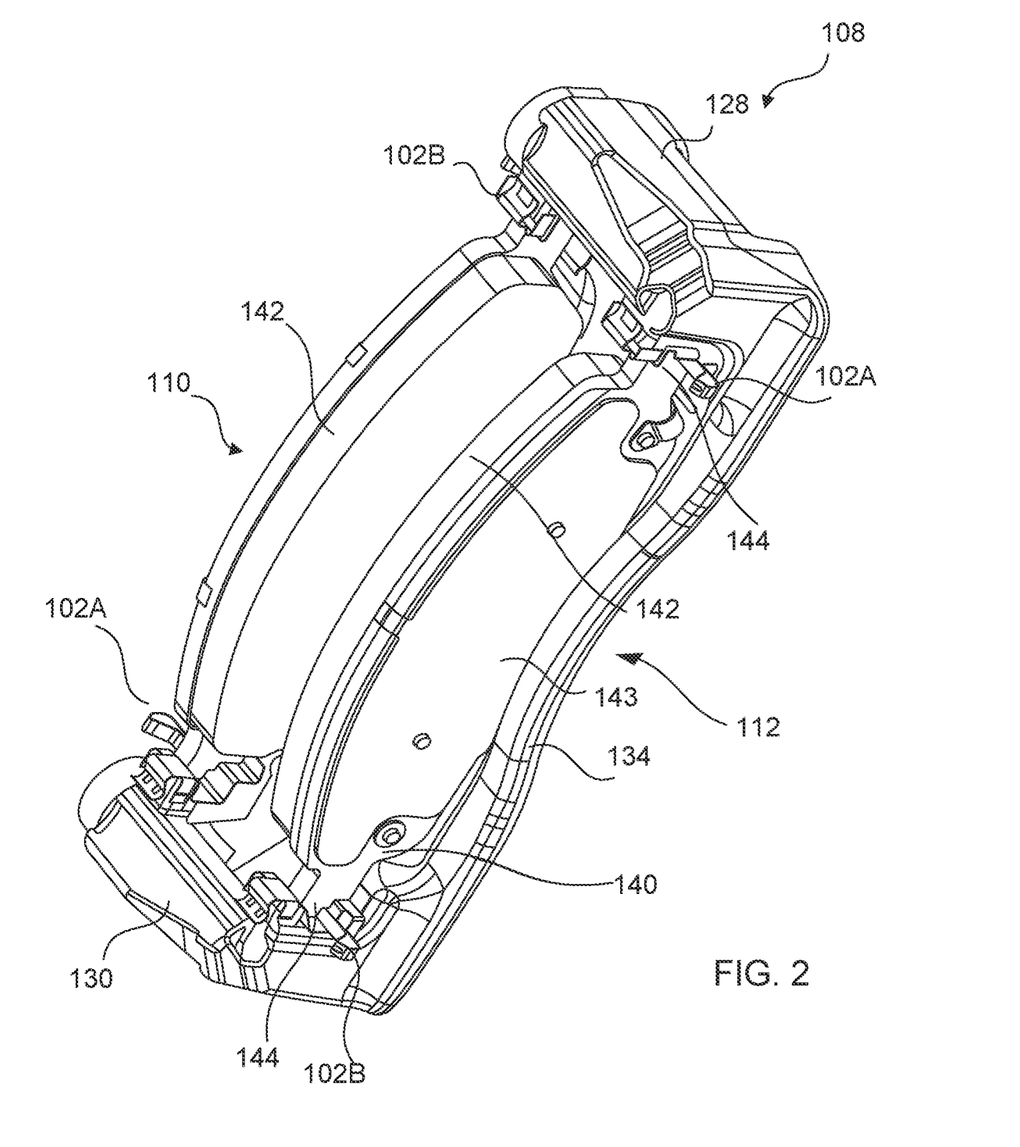
FIG. 2 illustrates a perspective view of an assembled anchor element of the disc brake assembly of FIG. 1.

FIG. 2 is a perspective view of an assembled anchor bracket 108 with brake slide clips 102A, 102B and brake pads 110, 112 connected and engaged to the bracket.

Because brake slide clip 102A is a mirror image of brake slide clip 102B, the description herein of brake slide clip 102B also applies to brake slide clip 102A.

Figure 3:
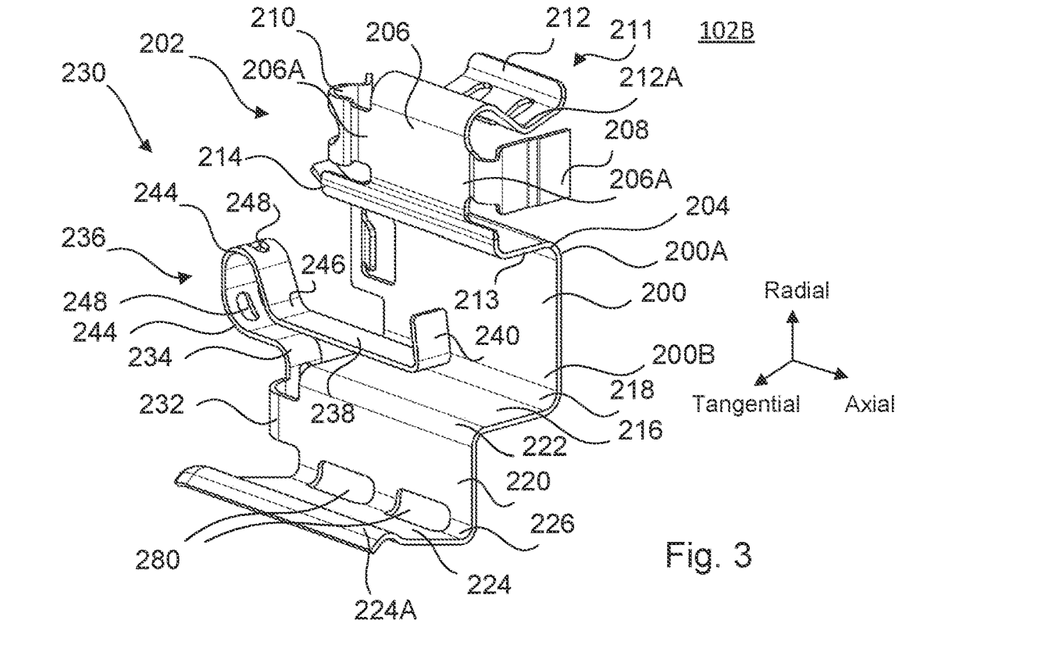
FIGS. 3 and 4 illustrates a brake slide clip of the disc brake assembly according to an example embodiment.
Figure 4:
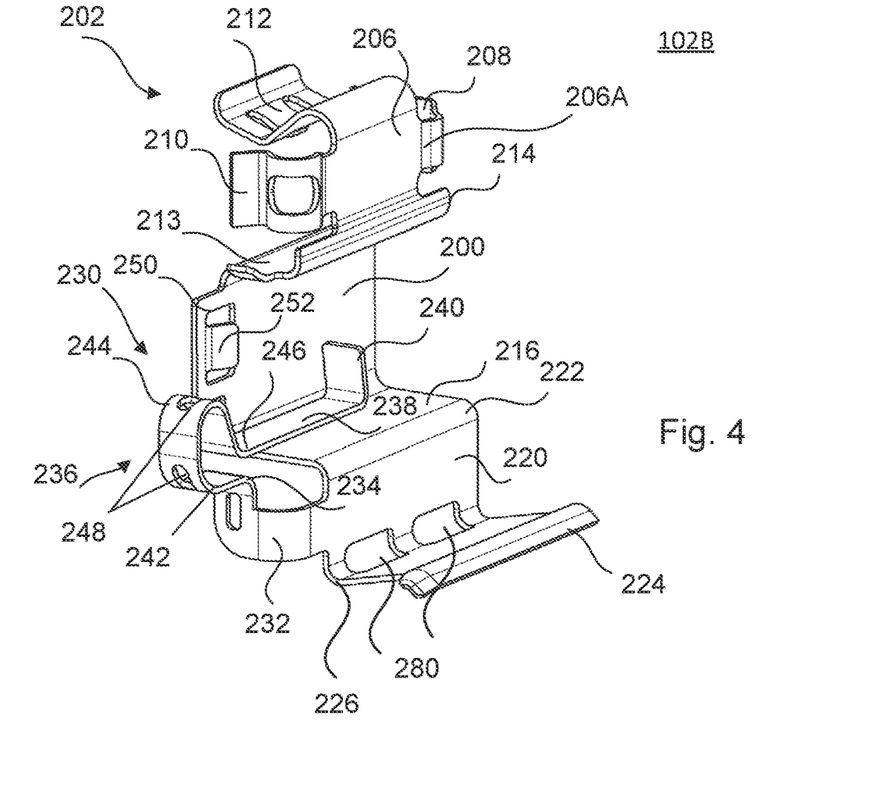
Figure 5:
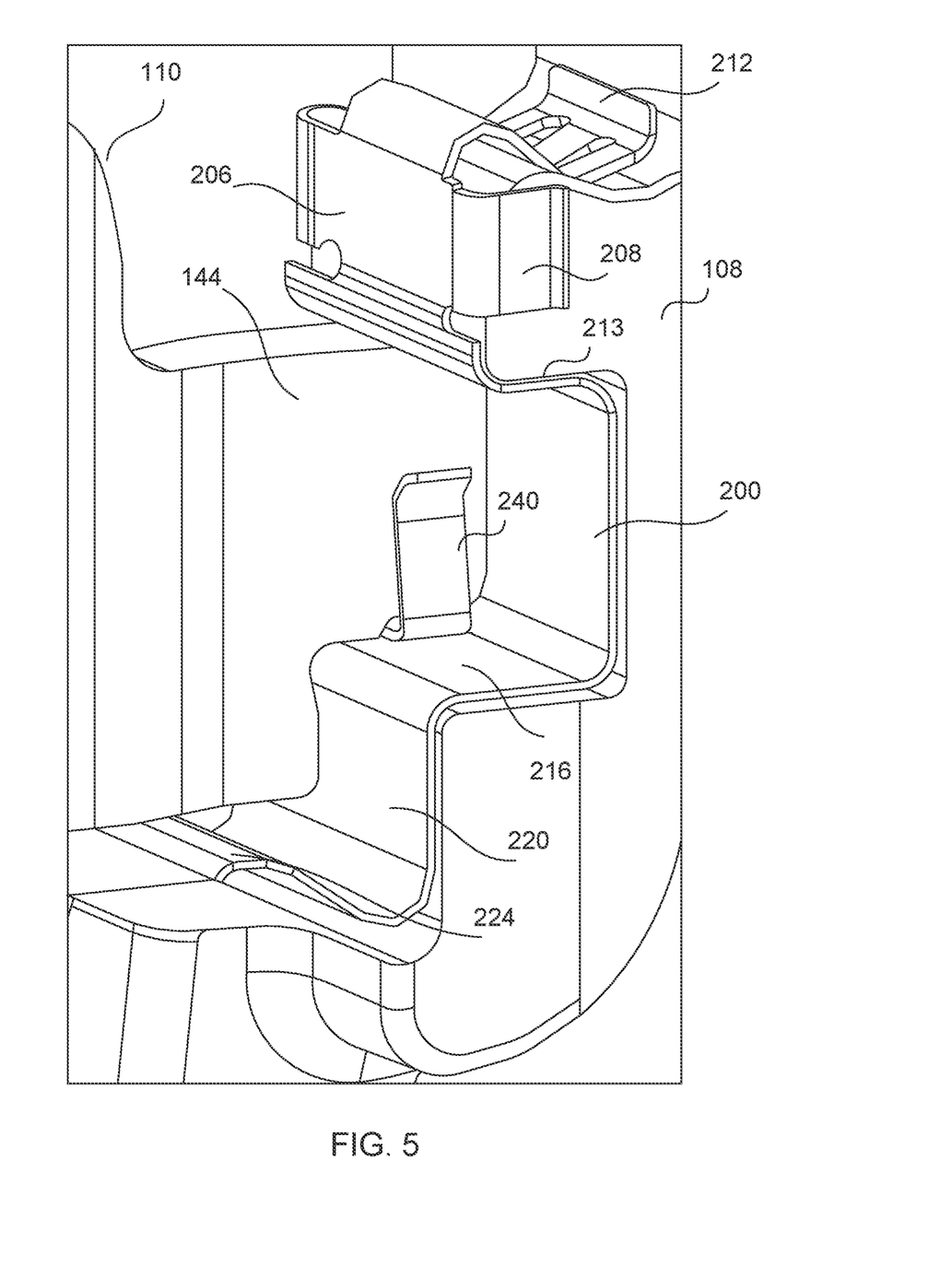
FIG. 5 illustrates a partial perspective view of the brake slide clip, a brake pad and an anchor element of the disc brake assembly of FIG. 1.

FIGS. 3-5 illustrate brake slide clip 102B according to an example embodiment. In this embodiment, brake slide clip 102B is formed from sheet metal and is configured to clamp or otherwise engage with a notch 136 of anchor bracket 108. As shown, brake slide clip 102B includes a base section 200 which is largely rectangular. Extending from an end portion of base section 200 is a clamping portion 202 which is configured for clamping or otherwise engaging with anchor bracket 108. Clamping portion 202 extends from a side 200A of base section 200 via a curved portion 204. Curved portion 204 is disposed between base section 200 and clamping portion 202 and includes a 90 degree curve.

Clamping portion 202 includes a base clamping section 206 which is generally rectangular. An inner axial holding tab 208 and an outer axial holding tab 210 extend from opposed axial sides 206A of base clamping section 206. Each axial holding tab 208, 210 is bent from base clamping section 206 and extends in the same tangential direction for contacting opposed surfaces of anchor bracket 108. Clamping portion 202 further includes an upper clamping section 211 which extends from a top side of base clamping section 206 in the tangential direction for contacting a surface of anchor bracket 108 that is disposed between the surfaces of anchor bracket 108 which contact inner axial holding tab 208 and outer axial holding tab 210. Upper clamping section 211 includes a radial holding tab 212 having a curved portion 212A which contacts the surface of the anchor bracket 108. Clamping portion 202 further includes a lower clamping section 213 which extends from base clamping section 206 and is disposed opposite upper clamping section 211. A curved portion 214, forming a generally 90 degree curve, is disposed between lower clamping section 213 and base clamping section 206. Inner axial holding tab 208 and outer axial holding tab 210 do not extend in an axial direction beyond axial sides of lower clamping section 213 and base section 200. In other words, base clamping section 206 is smaller in the axial direction than lower clamping section 213 and base section 200. In particular, the inner axial holding tab 208 does not extend in the axial direction farther than the sides 200A and 200B of base section 200 in the axial direction. The inner axial holding tab 208, the outer axial holding tab 210, the upper clamping section 211 and the lower clamping section 213 engage with and clamp to the anchor bracket 108.

Extending from a side 200B of base section 200 that is opposite the side 200A from which clamping portion 202 extends is a lower section 216. A curved portion 218, which forms a 90 degree curve, is disposed between base section 200 and lower section 216. Extending from a side of lower section 216 that is opposite the base section 200 is a tangential abutment section 220. A curved portion 222, which forms a 90 degree curve, is disposed between tangential abutment section 220 and lower section 216.

Extending from a side of the tangential abutment section 220 opposite lower section 216 is an extension section 224. A curved portion 226, which forms a 90 degree curve, is disposed between the extension section 224 and the lower tangential abutment section 220. Extension section 224 is generally flat and includes a distal portion 224A which extends from the generally flat region of extension section 224 and has a curved shape. A convex surface of distal portion 224A is configured to support a radial end portion of a brake friction pad 142, as shown in FIG. 5. FIG. 5 illustrates a brake slide clip 102B mounted to and engaged with the anchor bracket 108. As shown, base section 200, lower clamping section 213, base clamping section 206, lower section 216 and tangential abutment section 220 are disposed against and adjacent corresponding surfaces of the anchor element 108.

Brake slide clip 102B further includes cutout 250 defined along base section 200. Extending into the cutout from one side thereof is an axial retention tab 252. Axial retention tab 252 is bent so that it is not in the same plane as base section 200 and instead extends partly in the tangential direction. Axial retention tab 252 serves as a stop, in the axial direction, for brake pad 110 or 112 when the brake pad is disposed in its operable position along brake slide clip 102B and anchor bracket 108.

As shown in FIGS. 3-5, brake slide clip 102B includes an integrated active retraction element, generally shown at 230, which serves to retract a corresponding brake pad 110 or 112 from the corresponding rotor, thereby avoiding brake drag caused by brake pad 110, 112 contacting the brake rotor following completion of a braking operation. Active retraction element 230 is formed from a thin metal strip and includes simple curved or bent portions, such as curves each of which is in a single dimension and are not twisted, torqued or otherwise bent in second or third dimensions. Active retraction element 230 extends from tangential abutment section 220 and extends over lower section 216. A guide rail 144 of an inner brake pad 112 or outer brake pad 110 are disposed on the active retraction element 230 above lower section 216 (best seen in FIG. 5).

In an example embodiment, the active retraction element 230 includes a connection section 232 which is connected to and extends from the tangential abutment section 220. In the illustrated example embodiment, connection section 232 has a 90 degree curve which bends in the tangential direction. Active retraction element 230 further includes a spring section 236 which extends from curved portion 234, a flat link section 238 which extends from spring section 236 having a first surface on which a guide rail 144 is disposed, and a contact section 240 which extends from link section 238 and has a second surface against which the guide rail 144 is disposed.

Spring section 236 is configured to return to its retracted position following a brake pad 110, 112 having moved link section 238 and contact section 240 in an axial direction towards the vehicle rotor during a braking operation. In returning to its retracted position, spring section 236 moves the corresponding brake pad 110, 112 away from the rotor so as to ensure the brake pad no longer contacts the rotor. In the illustrated example embodiment, spring section 236 includes a curved portion 234 which forms a 90 degree curve in the axial direction. The spring section 236 is formed by a thin metal strip being shaped in three curved portions 242, 244 and 246, each of which is a curve or bend in a single direction. In other words, curved portions 234, 242, 244 and 246 bend the thin metal strip in a plane formed by axial and radial axes, and do not bend the thin metal strip in a tangential direction. Curved portions 242, 244 and 246 position flat link section 238 above lower section 216 as shown in FIGS. 3-5. The sections of the active retraction element 230, i.e., spring section 236, link section 238 and contact section 240 are aligned with each other in the axial direction. Contact section 240 is disposed at the lengthwise end of link section 238. Contact section 240 is bent at least 90 degrees from flat link section 238. In one implementation, contact section 240 is bent from flat link section 238 by more than 90 degrees so that the distal end portion of contact section 240 contacts the friction pad 142 of a corresponding brake pad 110 or 112. As shown in FIG. 5, brake pad 110 or 112 is disposed against an upper portion or upper edge of the surface of contact section 240 which faces spring section 236.

It is noted that brake slide clips 102A and 102B are illustrated in the drawings as they are when engaged with the anchor bracket 108 and the brake pads 110 and 112, respectively. When disengaged and separated from the anchor bracket 108 and the brake pads, the spring section 236 may orient the flat link section 238 and the contact section 240 at an oblique angle relative to the lower section 216 so that the lengthwise end portion of the flat link section 238 connected to the contact section 240 is positioned closer to the base clamping section 206 than the lengthwise end portion of flat link section 238 connected to spring section 236 is positioned relative to the base clamping section 206.

The thin metal strip forming the spring section 236 includes one or more cutouts 248 defined through the metal strip. The number, size and position of these cutouts 248 serve to create sites for localized yielding of the spring as the brake pads wear. Cutouts 248 facilitate the plastic deformation of the spring section 236 during the life of the friction pad 142. In particular, the cutouts 248 facilitate the active retraction element 230 to provide a constant or near constant retraction force over the life of the friction pad 142 as the thickness of the friction pad decreases over time. This constant or near constant retraction force results in the retracted position of the active retraction element 230 changing over the life of the friction pad 142.

Brake slide clips 102A and 102B each includes cutouts 280 disposed in the curved portion 226 between the lower tangential abutment section 220 and the extension section 224. Best seen in FIGS. 3 and 4, cutouts 280 serve to reduce the stiffness of the extension section 224 by lowering its spring rate. This lowering of the spring rate results in less radial spring force variation in the installation range. Cutouts 280 allow for the extension section 224 to be shorter while achieving the same spring rate, thereby allowing for the length of the material blank, from which the brake slide clip 102A, 102B is created, to be shorter which saves material cost. The details of the material blank is discussed in greater detail below.

Brake slide clips 102A and 102B are formed from sheet metal. Brake slide clip 102A or 102B is formed from a material blank of sheet metal. In an example embodiment, a material blank from which brake slide clip 102A or 102B is formed is configured to be as small as possible so as to advantageously increase the number of blanks which can be made from the metal sheet. This is accomplished by having the thin metal strip from which the active retraction element 230 is formed to be disposed along a lengthwise side of a main portion of the blank and that a distal end of the thin metal strip does not extend beyond a lengthwise end of such blank main portion.

Figure 6:
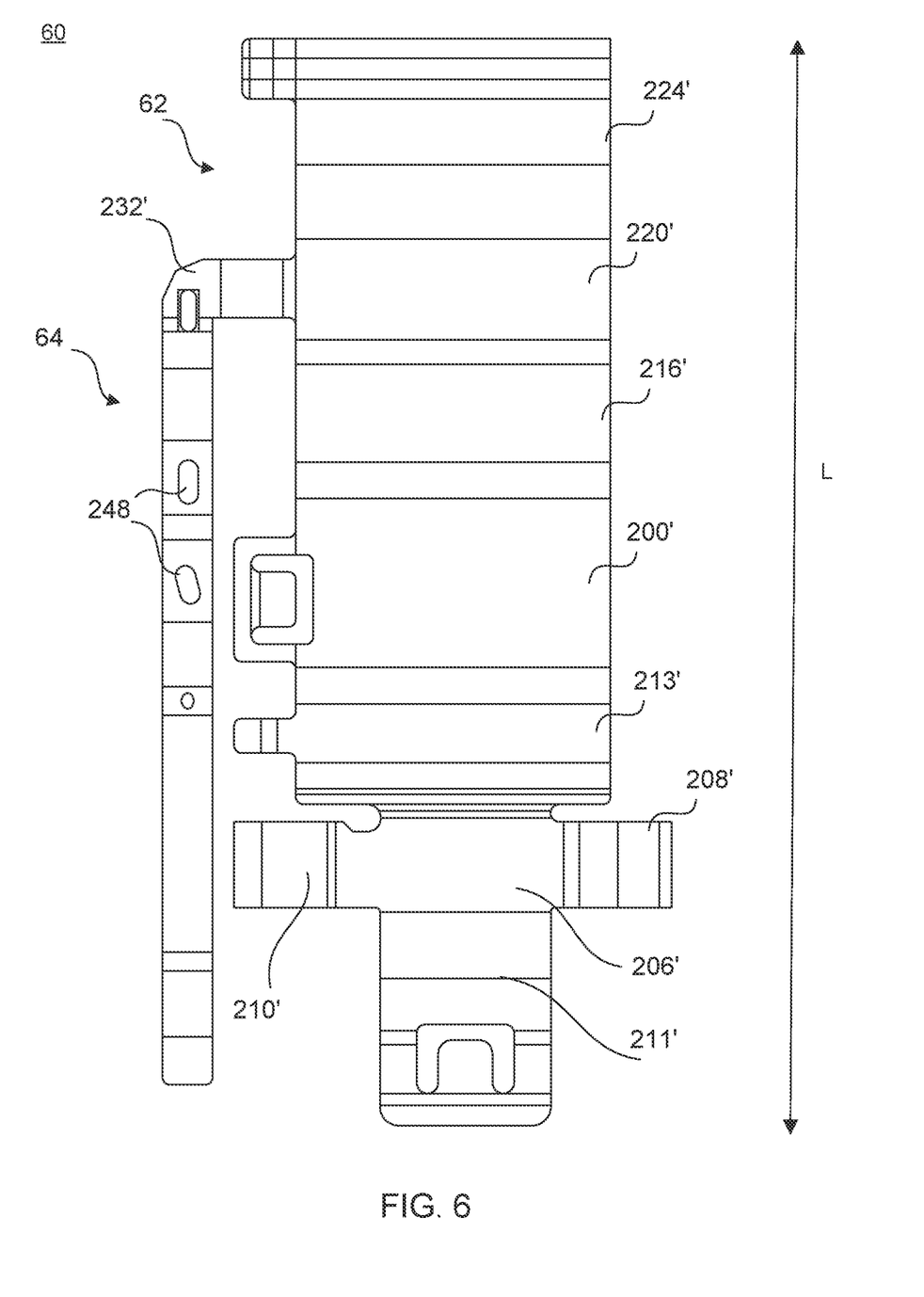
FIG. 6 illustrates a plan view of a material blank from which the brake slide clip of FIGS. 3 and 4 are formed, according to an example embodiment.

FIG. 6 illustrates a material blank 60 according to an example embodiment. Material blank 60 includes a main portion 62 of the material blank 60 having a length L. The main portion 62 of the material blank 60 includes the material portion 200' from which the base section 200 is formed; a material 216' portion from which the lower section 216 is formed; a material portion 220' from which the tangential abutment section 220 is formed; a material portion 224' from which the extension section 224 is formed; a material portion 206' from which the base clamping section 206 is formed; a material portion 208' from which the inner axial holding tab 208 is formed; a material portion 210' from which the outer axial holding tab 210 is formed; a material portion 213' from which the lower clamping section 213 is formed; and a material portion 211' from which the upper clamping section 211 is formed. Material portions 200', 216', 220', 224' and 213' may be seen as a first region of main portion 62 from which base section 200, lower section 216, tangential abutment section 220, lower extension section 224 and lower clamping section 213 are formed, respectively. Material portions 206', 208', 210' and 211' may be seen as a second region of main portion 62 from which the base clamping section 206, inner axial holding tab 208, outer axial holding tab 210 and upper clamping section 211 are formed, respectively.

A thin metal strip 64, from which active retraction element 230 is formed, extends along main portion 62 of material blank 60 in relatively close proximity thereto. The metal strip 64 includes a first lengthwise end which is connected to and extends from the main portion 62 of material blank 60, and a second (distal) lengthwise end. Because the length of the metal strip 64 exceeds half the length of main portion 62 of material blank 60 and extends a majority of the length L of the main portion 62, positioning the second lengthwise end of the thin metal strip 64 so that it is does not extend beyond the corresponding lengthwise end of main portion 62 of material blank 60 results in the first lengthwise end of thin metal strip 64 being connected to the material portion 220' of the main portion 62 from which the tangential abutment section 220 is formed. The positioning of the thin metal strip 64 relative to the main portion 62 of material blank 60 in this way reduces the overall size and/or footprint of material blank 60 thereby resulting in more blanks 60 being available on a metal sheet and/or less unused space on the metal sheet.

In addition, the metal strip 64, which is used to form the active retraction element 230, is disposed along a lengthwise side of main portion 62 of material blank 60 in close proximity therewith by having the material portion 232' of metal strip 64 (from which connection section 232 of the active retraction element 230 is formed) with only a single curved portion, which in this case is 90 degrees. This single curved portion of 90 degrees also results in sections of the active retraction element 230 (i.e., spring section 236, flat link section 238 and contact section 240) being disposed or aligned in the axial direction with each other following formation of brake slide clip 102.

A method of forming brake slide clip 102 from material blank 60 may include a series of bending and/or folding operations on the main portion 62 of the material blank 60 to form and/or create the relative positioning of the base section 200, the base clamping section 206, the inner axial holding tab 208, the outer axial holding tab 210, the radial holding tab 212, the lower section 216, the tangential abutment 220 and the extension section 224. The bending operations typically form 90 degree curved portions, though it is understood that bending operations which result in curves other than 90 degree curves are possible.

Forming the active retraction element 230 from material blank 60 also includes a series of bending and/or folding operations on the thin metal strip 64. The bending operations may include bending the material portion 232' of the metal strip 64 so that connection section 232 of the active retraction element 230 has a 90 degree curve in the tangential direction. The bending operations to form the spring section 236 may include bending a first portion of the spring section 236 to have a 90 degree curve (curved portion 234) in the axial direction, bending a second portion of the spring section 236 to have a 90 degree curve (curved portion 242) in the radial direction, bending a third portion of the spring section 236 in the axial and radial directions to form curved portion 244, and bending a fourth portion of the spring section 236 in the axial direction to form curved portion 246. Bending the distal end of the thin metal strip 64 to have a 90 degree curve in the radial direction forms contact section 240 from the flat link section 238. With the exception of the bending to form the connection section 232, the bending operations for forming the active retraction element 230 from the thin metal strip 64 do not bend the thin metal strip 64 in the tangential direction.

With brake slide clips 102A and 102B operably disposed in the brake assembly 100 as described above, a brake pad 110 or 112 coupled to and disposed on a corresponding pair of the brake slide clips 102 are caused to move in a first axial direction during a braking operation, toward the corresponding brake rotor so as to make contact therewith. Due to contact between the brake pad 110 or 112 with the contact section 240 of each corresponding brake slide clip 102A, 102B, this brake pad movement causes the active retraction element 230 to similarly move in the same axial direction. Upon completion of the braking operation, the force which caused the movement of the brake pad 110 or 112 is removed, which results in the active retraction element 230 returning to its retracted position by moving in a second axial direction that is opposite to the first axial direction. Contact section 240 likewise urges the now disengaged brake pad 110 or 112 to move in this second axial direction so that the brake pad is retracted from and no longer contacts the brake rotor, thereby avoiding brake drag.

The use of the brake slide clips 102 as discussed above assists in avoiding undesirable brake drag caused by brake pad-to-rotor contact. The active retraction element provides brake pad retraction away from rotor post brake application. The active retraction element is configured to provide a nearly constant retraction force over the pad wear and rotor wear. The constant retraction force is achieved by the geometry and cut-outs of the spring section 236 of the active retraction element 230. In addition, the blank shape of the clip is enhanced in order to reduce scrap sheet metal when stamping the material blanks 60 from a metal sheet, and increases the yield of the metal sheet.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A brake slide clip for use in a disc brake assembly comprising:
   a base section having a first side and a second side opposite the first side;
   a clamping portion extending from the first side of the base section, the clamping portion comprising a base clamping section, an inner axial holding tab which extends from a first side of the base clamping section, and an outer axial holding tab which extends from a second side of the base clamping section that is opposite the first side thereof, the clamping portion configured to clamp to a portion of an anchor bracket of the disc brake assembly;
   a lower section which extends from the second side of the base section, the lower section having a first side which extends from the base section and a second side; a tangential abutment section extending from the second side of the lower section; and an active retraction element which extends from the tangential abutment section, the active retraction element including a flat link section providing a first surface on which a brake pad of a disc brake is disposed, a contact section providing a second surface against which the brake pad is disposed, and a spring section coupled to the flat link section, the active retraction element disposed over the lower section and comprising a plurality of curved portions, each curved portion being curved in a single direction, wherein when the active retraction element is coupled to the brake pad, the active retraction element is movable from a retracted position relative to the base section and the lower section responsive to movement of the brake pad presenting a force against the second surface of the contact section, and resiliently returns to the retracted position upon a spring force acting on the flat link section by the spring section overcoming the force presented by the brake pad; and
   wherein the lower section is disposed perpendicular to the base section, and the tangential abutment section is disposed perpendicular to the lower section.

2. The brake slide clip of claim 1, wherein the lower section extends from the base section via a first curved portion disposed between the lower section and the base section.

3. The brake slide clip of claim 2, wherein the tangential abutment section extends from the lower section via a second curved portion disposed between the tangential abutment section and the lower section.

4. The brake slide clip of claim 3, wherein the base clamping section extends from the base section via a third curved portion disposed between the base clamping section and the base section.

5. The brake slide clip of claim 1, further comprising an extension section which extends from the tangential abutment section via a fourth curved portion, wherein the brake pad is disposed on a distal end portion of the extension section, and wherein the fourth curved portion includes one or more cutouts defined therein.

6. The brake slide clip of claim 5, wherein the base section is disposed between the clamping portion and the lower section, the lower section is disposed between the base section and the tangential abutment section, and the tangential abutment section is disposed between the lower section and the extension section.

7. The brake slide clip of claim 1, wherein the clamping portion further comprises an upper clamping section and a lower clamping section which extend from a third side and a fourth side, respectively, of the base clamping section, the clamping portion clamping to the portion of the anchor bracket by the inner axial holding tab, the outer axial holding tab, the upper clamping section and the lower clamping section.

8. The brake slide clip of claim 1, wherein the inner axial holding tab does not extend further in the axial direction than the second side of the base clamping section.

9. The brake slide clip of claim 1, wherein the plurality of curved portions align sections of the active retraction element relative to each other in axial directions.

10. The brake slide clip of claim 9, wherein each curved portion is in a radial direction or an axial direction.

11. A method of forming a brake slide clip for a disc brake assembly, comprising:
    forming a material blank having a main portion and a metal strip extending from a lengthwise side of the main portion;
    defining a base section, a lower section, a tangential abutment section from and a lower clamping section from a first region of the main portion by bending the lower section relative to the base section, bending the tangential abutment section relative to the lower section, and bending the lower clamping section relative to the base section, the lower section extending from the base section via a first curved portion, and the tangential abutment section extending from the lower section via a second curved portion, and the lower clamping section extending from the base section via a third curved portion;
    defining a base clamping section, an upper clamping section, an inner axial holding tab, and an outer axial holding tab from a second region of the main portion by bending opposed lateral end portions of the second region so as to form the inner and outer axial holding tab, bending the base clamping section relative to the lower clamping section, and bending the upper clamping section relative to the base clamping section; and
    defining an active retraction element by bending the metal strip relative to the tangential abutment section in a plurality of bending operations so that portions of the active retraction element are aligned with each other in an axial direction.

12. The method of claim 11, wherein each bending operation of the plurality of bending operations of the metal strip bends the metal strip in a single direction.

13. The method of claim 12, wherein the active retraction element includes a flat link section having a first surface for receiving a brake pad thereon, and a number of the plurality of bending operations for bending the metal strip between the tangential abutment section and the first surface comprises at least four bending operations.

14. The method of claim 12, wherein each of the plurality of bending operations of the metal strip is a bending operation in a radial direction or an axial direction.

15. The method of claim 14, wherein the metal strip includes a material portion for a connection section of the active retraction element which extends from the tangential abutment section, and forming the active retraction element comprises bending the material portion for the connection section of the active retraction element in a tangential direction.

16. The method of claim 11, wherein defining the upper clamping section comprises forming a radial holding tab by bending a lengthwise end portion of the second region of the main portion, the lower clamping section, the radial holding tab, the inner axial holding tab and the outer axial holding tab are configured for mounting the brake slide clip to an anchor bracket of the disc brake assembly.

17. The method of claim 11, wherein the first and second curved portions each comprises a 90 degree curve.

18. The method of claim 11, wherein prior to any bending and prior to performing the bending operations, the metal strip is disposed along the lengthwise side of the main portion and has a first lengthwise end which extends from the lengthwise side of the main portion and a second lengthwise end which does not extend further than a lengthwise end of the main portion.

19. The method of claim 18, wherein the first lengthwise end of the metal strip extends from the lengthwise side of the main portion in a single 90 degree curve.

\* \* \* \* \*